April 2, 1940.   E. J. W. RAGSDALE ET AL   2,195,599
VEHICLE
Filed April 19, 1937
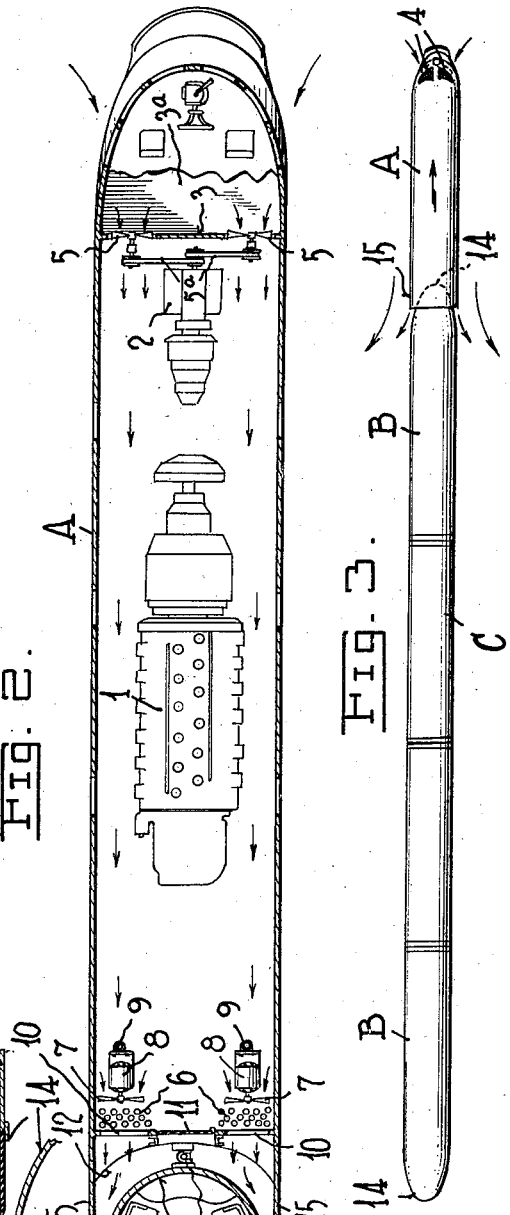
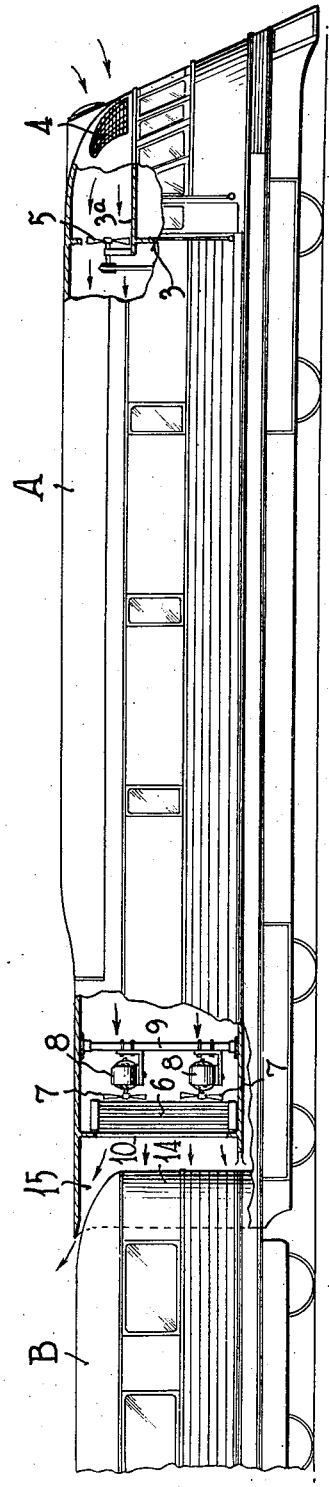
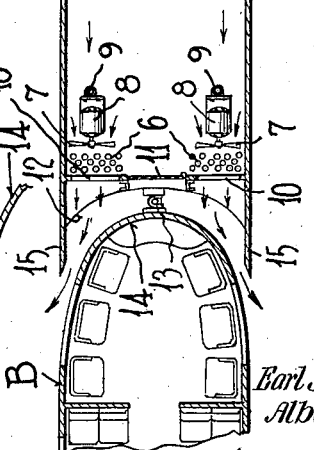
Inventors
Earl J.W. Ragsdale and
Albert G. Dean
By John P. Barbox
Attorney Patented Apr. 2, 1940

2,195,599

UNITED STATES PATENT OFFICE 2,195,599

VEHICLE

Earl J. W. Ragsdale, Norristown, and Albert G. Dean, Narberth, Pa., assignors to Edward G. Budd Manufacturing Company, Philadelphia, Pa., a corporation of Pennsylvania Application April 19, 1937, Serial No. 137,730

10 Claims. (Cl. 105—2)

This invention relates to railroad trains, and more particularly to streamlined trains propelled by a motor of the internal combustion engine type.

The object of the invention is to provide improved means for cooling and scavenging the interior of the motor unit and for causing a flow of air through the motor cooling radiators.

Another object is to devise a streamlined train made up of a series of cars, the end units of which are identical, and to devise a motor unit having a rear end constructed to cooperate with either end car of the series, whereby the motor unit may be coupled to either end of the train as desired.

More specifically, the invention contemplates a car unit at each end of the train having a rounded end, and a motor unit having a recess into which such rounded end is received, the side walls of the motor unit embracing and spaced from the walls of the car unit, whereby the flow of air due to the forward travel of the train produces a Venturi or aspirating effect which tends to draw air out from the rear of the motor unit through the spaces between the walls.

The invention still further contemplates the mounting of motor cooling radiators adjacent openings at the rear of the motor unit, whereby the air drawn through the interior of the motor unit by the aspirating effect above referred to passes through the motor cooling radiators.

In order that the invention may be readily understood, reference is had to the accompanying drawing forming part of this specification, and in which—

Fig. 1 is a side elevation of a motor unit and the forward end of a car unit coupled thereto, these units being constructed in accordance with the invention, and parts being broken away and parts shown in section;

Fig. 2 is a sectional plan view of the units shown in Fig. 1, parts being broken away;

Fig. 3 is a plan view, on a smaller scale, of a complete train comprising a series of car units and a motor unit; and Fig. 4 is a fragmentary sectional view of certain parts shown in Fig. 2 but illustrating a slightly modified construction.

Referring to the drawing in detail, A designates the motor unit, B the end units of the series of cars, and C the intermediate car units.

The motor unit, which is shown as of the so-called "Diesel electric" type, contains a main internal combustion engine 1, coupled to a generator, and an auxiliary engine 2. At the forward end of the motor unit is the driver's compartment, separated from the main compartment or interior of the unit by means of a bulkhead 3, and also provided with a horizontal partition 3ª connected with this bulkhead.

Grilled openings 4 are provided at the front of the motor unit at a point above the ceiling or partition 3ª, and openings are formed in the bulkhead 3 above the partition 3ª through which air entering through the grilled openings 4 may freely pass. In order to assist the natural draft in causing a free flow of air through these openings, fans 5 may be mounted therein, suitably driven as by means of belts 5ª from the auxiliary motor or engine 2.

At the rear of the motor unit are mounted the radiator or radiators 6 which are connected with the main engine 1 by suitable piping (not shown). As illustrated, two such radiators are provided, one at each side of the unit and extending substantially the full height thereof. In order to force air through these radiators, fans 7, driven by electric motors 8, suitably supported on framework 9, may be provided.

The rear wall of the motor unit immediately behind the radiator 6 is, of course, open as indicated at 10 in order to permit free passage of air through the radiators. A door 11 is preferably set in the rear wall between the radiators 6.

The rear edge of the floor or lower portion of the motor unit is concave as shown at 12 in Fig. 2, and the ends of each of the end cars B are rounded as shown at 14. This rounding is preferably of such shape as to provide a car end of substantially streamlined form.

The front end of the car unit B is connected to the rear end of the motor unit A by means of any desired type of coupling 13.

The side and top walls of the motor unit A extend rearwardly on each side of and embrace the rounded end of the car unit B as indicated at 15 in Fig. 2, the rear edges of these walls 15 being spaced from the curved walls of the rounded car end.

Thus the rear end of the motor unit is provided with a recess into which the rounded end 14 of the car unit is received.

From the foregoing it will be apparent that the flow of air past the walls of the motor unit and car unit, due to the forward travel of the train, will produce a Venturi or aspirating effect in the spaces between the walls of the respective units, and that this aspirating effect will tend to draw air rearwardly through the interior of the motor unit from the grilled openings 4 past the radiators 6 and out of the openings 10, the interior of the motor unit being, of course, open and unobstructed, so that air may flow therethrough.

In order to increase this movement of air through the interior of the motor unit and past the radiators 6, the fans 5 and 7, above described, are preferably employed. In many cases, it may not be necessary to use fans at both ends of the car as shown, and the invention contemplates using either the fans 5 or the fans 7, or both. Under some circumstances, the aspirating effect alone may be sufficient to cause a satisfactory movement of air through the motor unit, without the necessity for the employment of any fans whatever as in cold weather.

The invention further contemplates the employment of a car unit such as B, having a rounded end 14, at each end of the series making up a train, so that both ends are identical, and a motor unit such as A may be coupled to either end as desired. This avoids the necessity of turning trains around at terminals, and results in the rear end being of streamlined form, regardless of the direction of movement.

The over-all width of the motor and car units is, of course, substantially the same, as shown in Fig. 3, so that air sweeps freely past the openings or spaces between the rear walls of the motor unit and the curved walls of the forward end of the adjacent car unit, thus producing a strong aspirating effect, as above described.

In some cases, where the wheel bases are relatively short, and the curves on the track are of small radius, it may be desirable to construct the rear portions of the side walls of the motor unit of flexible material such as rubber, or rubber and fabric. This is indicated at 15ª in Fig. 4. Where, however, the wheel bases are relatively long and the curves are of large radius, the spaces between the walls, as illustrated in Fig. 2, will be sufficient to permit the units to pivot freely with respect to each other, without contact.

What we claim is:

1. A railroad train comprising a motor unit having rearwardly extended side walls and a car unit having a tapered forward end, coupled together, the motor unit having an air inlet opening adjacent its front and an air outlet opening at its rear, said car unit having its forward tapered end embraced by the rearwardly extended side walls of the motor unit, whereby the flow of air, due to the forward travel of the train, produces a Venturi effect at the coupled ends of said units tending to draw air rearwardly out of the interior of the motor unit.

2. A railroad train comprising a motor unit and a car unit, coupled together, the motor unit having an air inlet opening and an air outlet opening, respectively, at front and rear and having its side walls at the rear embracing and spaced from the side walls of the front end of said car unit, whereby the flow of air, due to the forward travel of the train, produces an aspirating effect tending to draw air out of the interior of the motor unit through the spaces between said walls.

3. A railroad train comprising a motor unit and a car unit, coupled together, the motor unit having an air inlet opening at its front and an air outlet opening at its rear, and an open interior, the rear side walls of said motor unit embracing the side walls of the car unit, and spaced therefrom, whereby the flow of air, due to the forward travel of the train, produces an aspirating effect tending to draw air through the motor unit and out of the rear end thereof by way of the spaces between said walls.

4. A railroad train comprising a motor unit and a car unit having a tapered front end, coupled together, the motor unit having an air inlet at its front and an air outlet its rear and being of substantially the same over-all width as the main body of the car unit and having its side walls at the rear embracing and spaced from the side walls of the tapered front end of said car unit, whereby the flow of air, due to the forward travel of the train, produces an aspirating effect tending to draw air out of the interior of the motor unit through the spaces between said walls.

5. A railroad train comprising a motor unit and a car unit coupled together, the forward end of the car unit being tapered, and the rear end of the motor unit having its side walls extended to provide a recess to receive said tapered end of the car unit, said motor unit having an air inlet opening at its front and an air outlet opening at its rear discharging into said recess the side walls of the motor unit being spaced from the walls of the tapered car end, whereby the flow of air past said walls as the train travels forward tends to draw air out from the interior of the motor unit through the spaces between said walls.

6. A railroad train comprising a motor unit and a car unit coupled together, the forward end of the car unit being rounded and having curved side walls and the rear end of the motor unit having its side walls extended to provide a recess to receive said rounded end of the car unit, said motor unit having an air inlet opening at its front and an air outlet opening at its rear discharging into said recess the side walls of the motor unit being spaced from the curved walls of the rounded car end, whereby the flow of air past said walls as the train travels forward tends to draw air out from the interior of the motor unit through the spaces between said walls.

7. A railroad train comprising a car unit and a motor unit of the internal combustion engine type coupled together, the motor unit having air inlet and air outlet openings at its front and rear ends, respectively, and a motor cooling radiator mounted adjacent the outlet opening at the rear end, the forward end of the car unit being tapered and the rear end of the motor unit having its side walls extended to provide a recess to receive said tapered end of the car unit, and the air outlet opening discharging into said recess whereby the flow of air, due to the forward travel of the train, produces an aspirating effect at the coupled end of said units tending to draw air rearwardly through said motor unit and through said radiator.

8. A railroad train comprising a car unit and a motor unit of the internal combustion engine type coupled together, the motor unit having air inlet and air outlet openings at its front and rear ends, respectively, and a motor cooling radiator mounted adjacent the opening at the rear end, the rear side walls of said motor unit embracing and spaced from the walls of the front end of said car unit, whereby the flow of air, due to the forward travel of the train, produces an aspirating effect tending to draw air rearwardly through said motor unit and through said radiator and outlet opening.

9. A railroad train comprising a car unit and a motor unit of the internal combustion engine type coupled together, the motor unit having air inlet and air outlet openings at its front and rear ends, respectively, and a motor cooling radiator mounted adjacent the opening at the rear end, the rear side walls of said motor unit embracing and spaced from the walls of the front end of said car unit, whereby the flow of air, due to the forward travel of the train, produces an aspirating effect tending to draw air rearwardly through said motor unit and through said radiator and the air outlet opening, and additional means serving to increase such rearward movement of air.

10. A railroad train comprising a motor unit and a car unit, coupled together, the motor unit having air inlet and air outlet openings, respectively, at the front and rear and having its side walls at the rear formed of flexible material and embracing and spaced from the side walls of the front end of said car unit, whereby said units may pivot freely with respect to each other, and whereby the flow of air, due to the forward travel of the train, produces an aspirating effect tending to draw air out of the interior of the motor unit through the spaces between said walls.

EARL J. W. RAGSDALE.
ALBERT G. DEAN.